Figure 1:
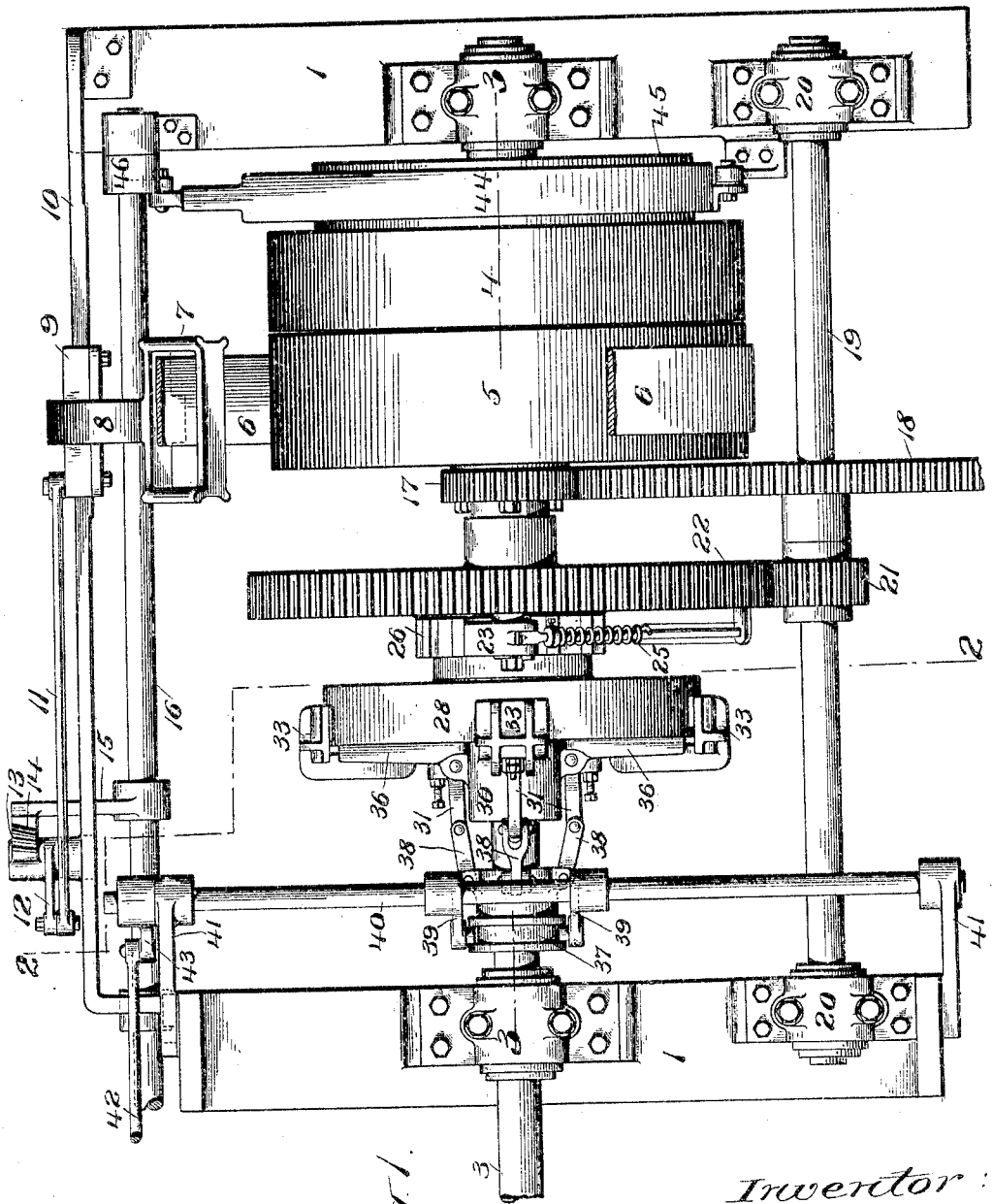

No. 802,694. PATENTED OCT. 24, 1905.
M. B. HULL.
DRIVING MECHANISM.
APPLICATION FILED APR. 6, 1903.

2 SHEETS—SHEET 1.

Inventor:
Maurice B. Hull
by Philipp, Sawyer, Rice & Kennedy
Attys.

Attest:
A. White
W. H. Kennedy

No. 802,694. PATENTED OCT. 24, 1905.
M. B. HULL.
DRIVING MECHANISM.
APPLICATION FILED APR. 6, 1903.
2 SHEETS—SHEET 2.
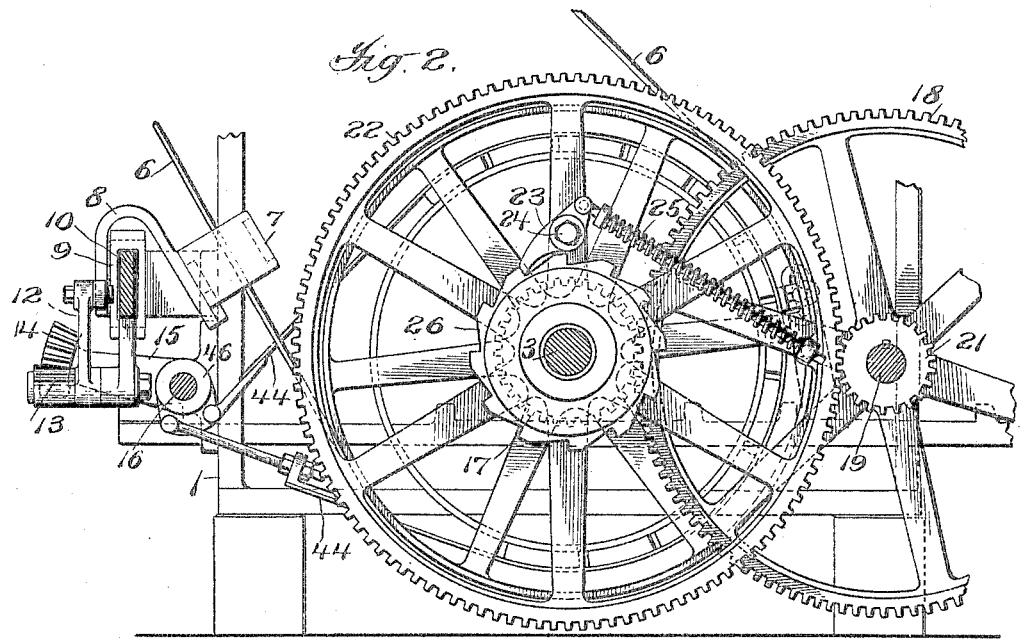
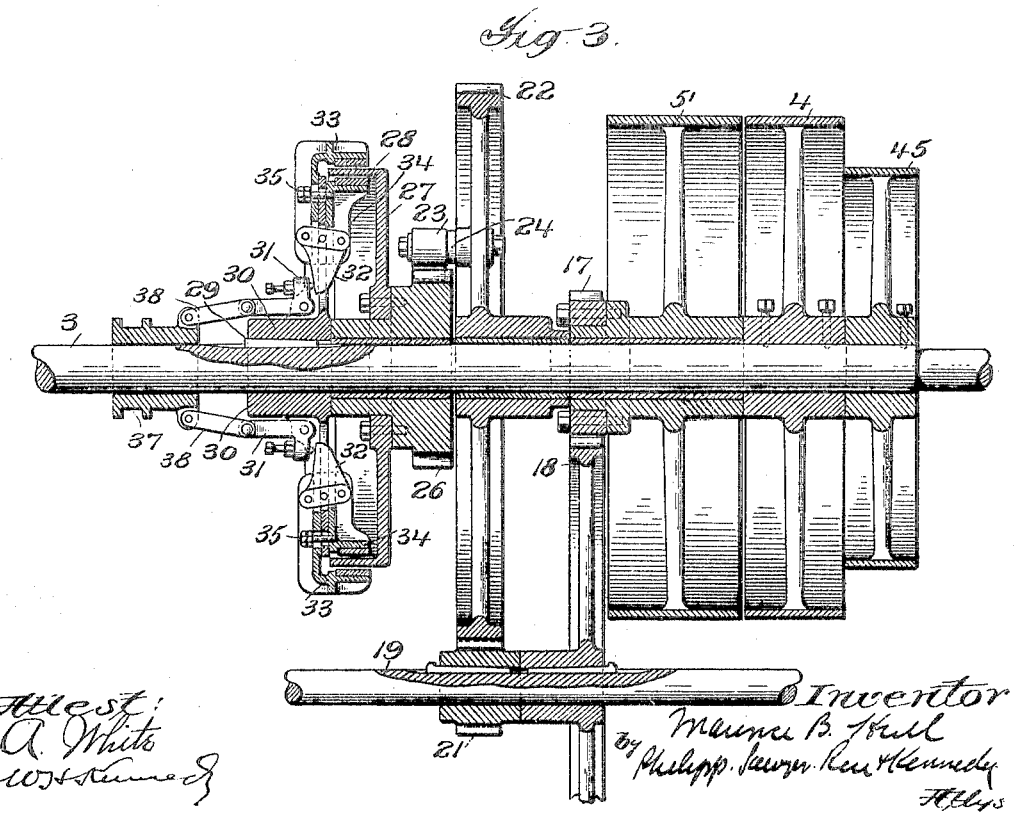

UNITED STATES PATENT OFFICE.

MAURICE B. HULL, OF NEW YORK, N. Y., ASSIGNOR TO ROBERT HOE, OF NEW YORK, N. Y.

DRIVING MECHANISM.

No. 802,694.     Specification of Letters Patent.     Patented Oct. 24, 1905.

Application filed April 6, 1903. Serial No. 151,238.

*To all whom it may concern:*

Be it known that I, MAURICE B. HULL, a citizen of the United States, residing at New York, county of Kings, and State of New York, have invented certain new and useful Improvements in Driving Mechanisms, fully described and represented in the following specification and the accompanying drawings, forming a part of the same.
This invention relates to certain improvements in driving mechanisms.

In driving heavy machinery—such, for instance, as printing-machines—it is desirable to start the machine by a mechanism which will permit it to run at first at a low speed and to thereafter run the machine up to full speed. Furthermore, a mechanism by which the machine can be run at first at a low speed not only permits the machine to be started more easily, but especially in printing machinery the low-speed mechanism enables the machine to be driven slowly while certain preparatory work—such, for instance, as "making ready" and the testing of adjustments—is being done.

In some of the constructions heretofore employed the driving-shaft has been driven by two engaging members—such, for instance, as the parts of a clutch which it has been necessary to disengage when the speed was changed from the low to the high speed—and in certain other constructions, where the engaging driving members remain in engagement when the change is made from low to high speed, the power for driving at the high and low speeds has been derived from different sources.

The present invention has for its object to produce a simple, cheap, and effective driving mechanism in which the same source of power is used to drive the machine when it is running at both low and high speeds and in which it is not necessary to interrupt the engagement between the members which effect the low-speed driving when the change is made from the low to the high speed.

With this and other objects in view the invention consists in certain constructions and in certain parts, improvements, and combinations, as will be hereinafter fully described and then specifically pointed out in the claims hereunto appended.

In the accompanying drawings, Figure 1 is a plan view of one form of driving mechanism embodying the invention. Fig. 2 is a section on the line 2 2 of Fig. 1, and Fig. 3 is a section on the line 3 3 of Fig. 1.

Referring to said drawings, 1 indicates a frame which may be of any suitable or approved construction, the particular construction of the frame depending largely upon the style of machine in which the driving mechanism is intended to be used. Supported in suitable bearings in the frame is a main driving-shaft 3, said shaft being provided in the construction shown with a fast pulley 4 and a loose pulley 5, although any other suitable driving means may be used instead of these pulleys. The pulleys in the construction shown are driven by means of a belt 6, which is in turn driven from any suitable source of power. (Not shown.) The belt may be shifted from the fast to the loose pulley by any suitable form of shifting mechanism. As shown, the belt is surrounded by a box 7, which is connected to a bracket 8, said bracket in turn being connected to a slide 9, which is mounted on a rail secured to a slide 9, which is mounted on a rail 10, secured to the frame. As the slide moves on the rail the belt will be shifted from one pulley to the other. The movement of the slide may be effected in any desired manner. As shown, there is connected to the slide a link 11, which is in turn connected to a crank-arm 12. This crank-arm 12 is operated from a small segment 13, which may be conveniently formed on the hub of the arm, the arm and segment being loosely mounted on a stud extending from the rail 10. This segment 13 engages with another segment 14, which is formed on or fast to an arm 15, mounted on a rock-shaft 16. When this rock-shaft is operated from a lever or by any other suitable operating means, said means not being shown herein, as they have no bearing on the present invention, the arm 15 will be rocked and the belt shifted in the manner hereinbefore described. When the belt is on the fast pulley 4, said pulley being, as before indicated, fast on the shaft 3, the shaft will be driven at high speed, and the printing-machine or other machine which the shaft is intended to drive will be run at its full speed.

The low-speed driving is effected from the same source of power as the high-speed driving—that is to say, from the belt 6—and includes a driving and a driven member, the driven member being adapted to run ahead of the driving member when the speed is increased without interrupting the engagement between the two. Furthermore, in the preferred form of construction the connections by which the low-speed driving is effected will include the loose pulley. The connections by which the belt and loose pulley effect the low-speed driving through the driving and driven members and the construction of the members themselves may be widely varied. As shown, there is bolted to the hub of the loose pulley a pinion 17, which is in engagement with a gear 18 on a counter-shaft 19, said shaft being supported in suitable bearings 20, mounted on the frame. This shaft 19 carries a pinion 21, which is in engagement with a gear 22, which in the construction shown is loosely mounted on the main shaft 3. The proportions of the gears 17 18 and 21 22 will be varied according to the number of revolutions it is desired to give the shaft 3 when the machine is running at the low speed.

In the preferred form of the construction the driving and driven members before referred to will consist of a pawl and ratchet, and preferably, furthermore, and as in the construction shown, the pawl will be mounted on the gear 22. In the drawings this pawl is marked 23 and is pivoted at 24 to one of the spokes of the gear 22, the pawl being held up to its duty in any suitable manner—as, for instance, by the ordinary spring-rod construction 25. In this form of the construction the ratchet which coöperates with the pawl 23 will be loose on the shaft, proper construction being provided to connect it to and disconnect it from the shaft when desired. In the construction shown the ratchet is marked 26.

The construction by which the ratchet is connected to and disconnected from the shaft when such construction is employed may be of any suitable character. In the preferred form of the construction a clutch will be used for this purpose. A suitable form of clutch is illustrated in the drawings. This clutch includes a disk 27, having a rim 28, the disk being bolted to the hub of the ratchet 26. Secured to the shaft 3 by means of a key 29 or in any other suitable manner is a hub 30, which carries a series of small bell-crank levers 31. Coöperating with these bell-crank levers are swinging plates 32, which serve to operate pairs of jaws 33 34, the jaws 33 being located on the outside of the rim 28 of the disk 27 and the jaws 34 being located on the inside. As shown, each pair of jaws is connected together by means of a screw 35, which is tapped into the jaw 34 and passes through a slot in the jaw 33. Each of the jaws 33 moves in a suitable guideway 36, these guideways being formed on arms extending from the hub 30. When the bell-cranks and the swinging plates 32 are operated, the jaws move inward or outward, as the case may be, thus clamping or releasing the rim 28 of the disk 27.

The operating devices for the bell-cranks may be of any suitable character; but, as shown, they include a collar 37, mounted on the shaft 3, said collar being connected, by means of links 38, to the outer arms of the bell-cranks. This collar is loose on the shaft and is moved toward and away from the hub 30 in the construction shown by means of arms 39, which are fast on a rock-shaft 40, said shaft being supported in arms 41, which are fast on the frame. This shaft may be operated in any desired manner. As shown, it is provided with an operating-lever 42, which is connected to an arm 43, fast on the shaft. As usual in constructions of this character, a brake may be provided, and one is herein shown, although it has no special connection with the present invention. As illustrated, this brake consists of a strap 44, which passes around a brake-pulley 45, fast on the shaft 3. The ends of this strap are connected to two short arms on a collar 46, fast on the shaft 16, before referred to, so that the brake will be operated when the belt is shifted from the fast to the loose pulley, or vice versa.

With the construction before described it is apparent that when the belt is on the loose pulley, as shown in Fig. 1, the gear 22 will be driven through the gears 17, 18, and 21, and if the clutch is operated so as to lock the ratchet 26 to the shaft 3 the shaft will be driven at a speed which, as before indicated, is determined by the proportions of the reducing gearing. If now the belt be shifted to the fast pulley 4, which, as before described, is directly secured to the shaft 3, the speed of the shaft will be immediately increased and the ratchet 26 will run away from the pawl. This construction permits the shaft to be speeded up as soon as the belt 6 begins to grip the fast pulley. It will be furthermore noted that it is not necessary to cause the parts of the ratchet and pawl to be disengaged, as the ratchet is free to run under the pawl. There is therefore no possibility of failure on the part of the mechanism to act, and there is also nothing to break, as is frequently the case in mechanisms of this character, in which the disengagement of the engaging members which effect the slow-speed driving has to be accomplished before the high-speed driving can be operative. At any convenient time after the machine has been thrown into the high speed the operator can by disengaging the clutch stop the rotation of the ratchet 26, and thus prevent unnecessary wear on the pawl and ratchet and the unnecessary noise which would result from the clicking of the ratchet as it runs under the pawl.

Changes and variations may be made in the construction herein shown for carrying the invention into effect. The invention is not, therefore, to be limited to the specific construction hereinbefore described.

What is claimed is—

1. The combination with a shaft, of a driving member, means whereby said driving member may be driven at a given speed, a driven member in engagement with the driving member, means independent of said engaging driving and driven members whereby the shaft may be driven at a higher speed than the speed of the driving member, said driven member being adapted to run ahead of the driving member without being disengaged therefrom, and means for connecting said driven member to and disconnecting it from the shaft, substantially as described.

2. The combination with a shaft, of a driving mechanism including a moving pawl and ratchet, said mechanism operating to drive the shaft at a given speed, and means independent of the pawl and ratchet for driving the shaft at a higher speed, said means being brought into operation without interrupting the engagement between the pawl and ratchet, substantially as described.

3. The combination with a shaft, of a driving mechanism including a pawl and ratchet for driving the shaft at a given speed, means for connecting one of said members to and disconnecting it from the shaft, and means independent of the pawl and ratchet for driving the shaft at a high speed, said means being brought into operation without interrupting the engagement between the pawl and ratchet, substantially as described.

4. The combination with a shaft, of a source of power, a driving member, connections from said source of power to said driving member whereby it may be driven at a given speed, a driven member in engagement with the driving member, means whereby said driven member drives the shaft, and connections independent of said engaging driving and driven members from the source of power to the shaft whereby the shaft may be driven at a higher speed than the speed of said driving member, said driven member being adapted to then run ahead of the driving member without being disengaged therefrom, substantially as described.

5. The combination with a shaft, of a source of power, a driving member, connections from said source of power to said driving member whereby it may be driven at a given speed, a driven member in engagement with the driving member, means whereby said driven member drives the shaft, connections independent of said engaging driving and driven members from the source of power to the shaft whereby the shaft may be driven at a higher speed than the speed of said driving member, said driven member being adapted to then run ahead of the driving member without being disengaged therefrom, and means for connecting the driven member to and disconnecting it from the shaft, substantially as described.

6. The combination with a shaft, of a source of power, driving connections between the shaft and the source of power including a moving pawl and ratchet, said connections operating to drive the shaft at a given speed, and driving connections independent of the pawl and ratchet between the source of power and the shaft for driving the shaft at a higher speed, said connections being brought into operation without interrupting the engagement between the pawl and ratchet, substantially as described.

7. The combination with a shaft, of a source of power, driving mechanism between the source of power and the shaft, said mechanism including a pawl and ratchet for driving the shaft at a given speed, means for connecting one of said members to and disconnecting it from the shaft, and driving connections independent of the pawl-and-ratchet driving mechanism for driving the shaft at a higher speed, said connections being brought into operation without interrupting the engagement of the pawl and ratchet, substantially as described.

8. The combination with a shaft, of fast and loose pulleys mounted thereon, a belt for driving either of said pulleys, a driving member, reducing-gearing between said driving member and the loose pulley, a driven member in engagement with said driving member, means whereby said driven member drives the shaft, the driven member being adapted to run ahead of the driving member when the shaft is driven from the fast pulley, substantially as described.

9. The combination with a shaft, of fast and loose pulleys mounted thereon, a belt for driving either of said pulleys, a pawl-and-ratchet mechanism one member of said mechanism being connected to the shaft, and reducing-gearing between the pawl-and-ratchet mechanism and the loose pulley, one member of the pawl-and-ratchet mechanism being adapted to run ahead of the other when the shaft is driven from the fast pulley, substantially as described.

10. The combination with a shaft, of fast and loose pulleys mounted thereon, a belt for driving either of said pulleys, a pawl-and-ratchet mechanism, means for connecting one member of said mechanism to and disconnecting it from the shaft, and reducing-gearing between the loose pulley and the pawl-and-ratchet mechanism, the member of the pawl-and-ratchet mechanism which is connected to and disconnected from the shaft being adapted to run ahead of the other member without being disengaged therefrom when the shaft is driven from the fast pulley, substantially as described.

11. The combination with a shaft, of fast and loose pulleys mounted thereon, a belt for driving either of said pulleys, a pawl, reducing-gearing between the pawl and the loose pulley, a ratchet with which the pawl engages, and a clutch mechanism for connecting the ratchet to and disengaging it from the shaft, the ratchet being adapted to run ahead of the pawl when the shaft is driven from the fast pulley, substantially as described.

In testimony whereof I have hereunto set my hand in the presence of two subscribing witnesses.

MAURICE B. HULL.

Witnesses:
F. W. H. CRANE,
S. ROEHM.